April 14, 1942.  R. L. FRISKNEY  2,279,669
SHAFT SEALING UNIT
Filed June 25, 1940  2 Sheets-Sheet 1
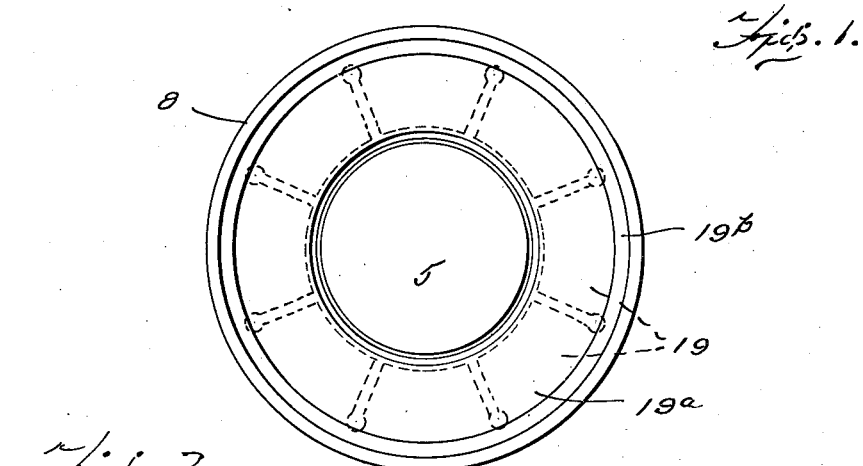
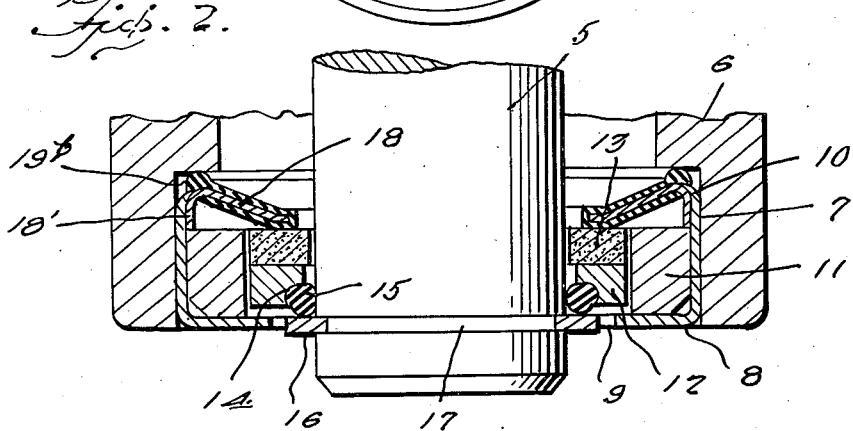
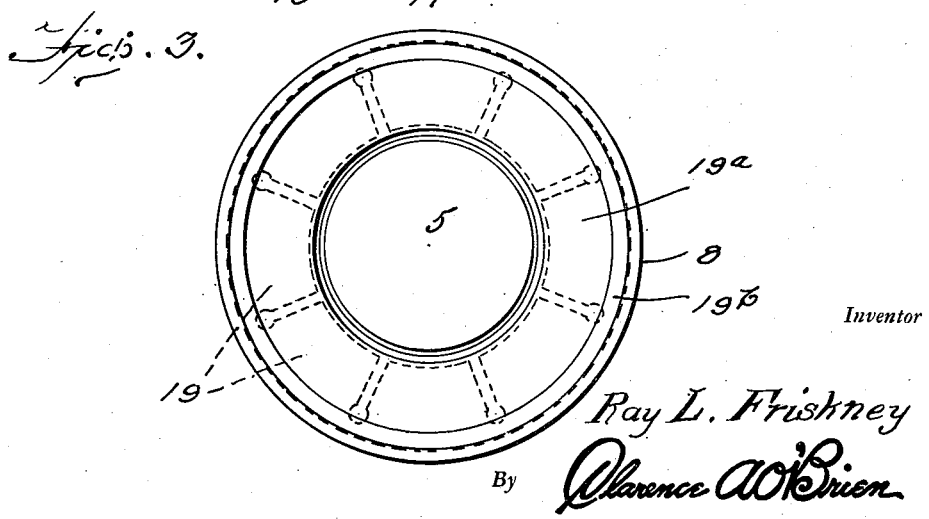
Inventor
Ray L. Friskney
By Clarence A. O'Brien
Attorney

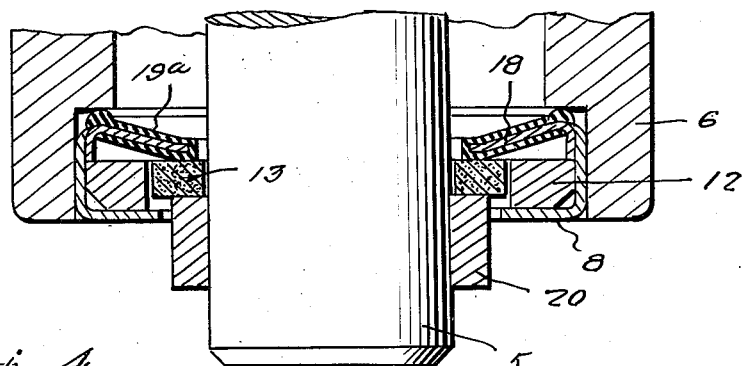
Fig. 4.
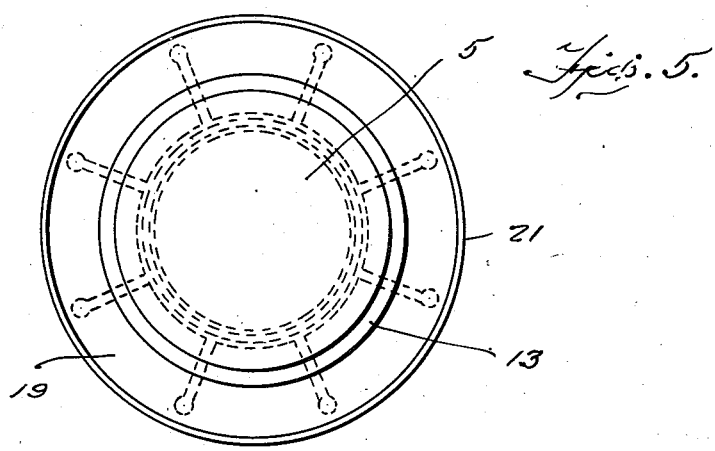
Fig. 5.
Fig. 6.
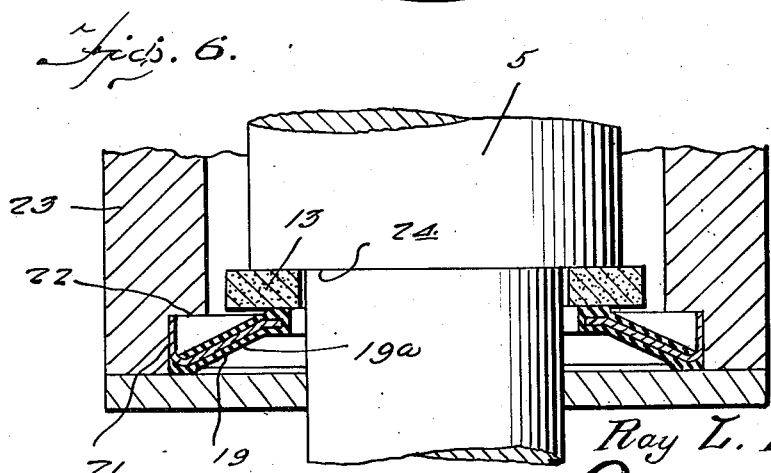
Inventor
Ray L. Friskney
By Clarence A. O'Brien
Attorney Patented Apr. 14, 1942

2,279,669

UNITED STATES PATENT OFFICE 2,279,669

SHAFT SEALING UNIT

Ray L. Friskney, Aurora, Ill.

Application June 25, 1940, Serial No. 342,383

5 Claims. (Cl. 286—7)

The present invention relates to new and useful improvements in shaft sealing means and has for its primary object to provide a sealing unit for the outer end of the shaft to prevent the escape of fluid, either in liquid or gaseous form, from the housing in which the shaft is mounted.

A further object is to provide an easily replaceable shaft sealing unit of this character of simple and practical construction, which is efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is an end elevational view of the shaft sealing unit embodying one form of the invention, Figure 2 is a transverse sectional view through the sealing unit, Figure 3 is an end elevational view of a modified form of shaft seal, Figure 4 is a transverse sectional view therethrough, Figure 5 is an end elevational view of a further modification, and Figure 6 is a transverse sectional view thereof.

Referring now to the drawings in detail, and with particular reference to Figures 1 and 2 thereof, the numeral 5 designates the shaft which is rotatable in the housing 6, the end of the housing having a counterbore 7 formed therein. Snugly fitted in the counterbore is the cup-like metallic casing 8 for the sealing or packing structure, the casing having its open end positioned inwardly of the counterbore and provided with a central opening 9 to accommodate the shaft. The inner edge of the casing is formed with an inturned lip designated at 10.

Positioned in the casing is a seal spacing ring 11, said spacing ring being spaced from the shaft and loosely positioned between the spacing ring and the shaft is an outer sealing ring 12 of bronze or other suitable material and an inner sealing ring 13 formed of carbon or other suitable material, the outer ring 12 overlying the edge of the opening 9 of the casing.

The inner periphery of the outer sealing ring 12, adjacent its outer surface, is formed with a channel 14 within which is fitted a yieldable packing ring 15 of rubber or other suitable material adapted for bearing against the shaft, as shown in Figure 2 of the drawings.

The sealing rings are secured in position upon the shaft by means of a split ring 16 seated in a groove 17 formed in the shaft and positioned to form an abutment for the packing ring 15.

An annular cup-spring 18 is positioned within the casing 8 having a flange 18' on its outer edge bearing against the spacing ring 11 and secured under the lip 10 of the casing. Projecting radially inwardly of the inner edge of the cup-spring 18 are a plurality of spring fingers 19 which are inclined outwardly with respect to the adjacent end of the shaft and adapted to bear against the carbon inner sealing ring 13. The spring fingers 19 are encased within a rubber covering 19a or the like.

The tension of the spring fingers 19 forces the rubber cover 19a against the carbon inner sealing ring 13 and retains the latter against rotation, while at the same time such pressure causes the inner sealing ring 13 to bear against the outer bronze sealing ring 12 and by reason of the packing ring 15 carried thereby causes rotation of said outer sealing ring together with the shaft.

The surface of the rubber cover 19a is formed with an annular beading 19b adapted to bear against the base of the counterbore 7 to prevent the escape of fluid from the counterbore around the outer edges of the casing. The edge of the cover 19 adjacent the beading may be clamped under the lip 10 when the latter is bent inwardly against the flange 18' of the cup-spring 18.

In the modified form of the invention illustrated in Figures 3 and 4 of the drawings, a bronze outer sealing sleeve designated at 20 is substituted for the bronze outer sealing ring 12 in Figures 1 and 2, the split ring 16 being dispensed with and the sleeve 20 being frictionally engaged with the shaft 5. The sleeve 20 projects outwardly of the casing 8 as shown in Figure 4 of the drawings, and otherwise the structure is similar to that heretofore explained.

In the modified form of the invention illustrated in Figures 5 and 6, the casing 8 is dispensed with and the cup-spring 21 is inverted and frictionally inserted in the counterbore 22 of the housing 23. The spring fingers 19 press the sealing ring 13 inwardly against a shoulder 24 formed on the shaft.

It is believed the details of construction, advantages and manner of use of the device will be readily understood from the foregoing without further detailed explanation.

Having thus described the invention, what I claim is:

1. A shaft sealing unit comprising a housing for the shaft having a counterbore, a cup-shaped retainer frictionally mounted in the counterbore, an outer sealing washer in the retainer, an inner sealing washer in the retainer positioned axially inwardly on the shaft relative to the outer sealing washer, means carried by the shaft forming an abutment for said washers, a cup-spring in the retainer and including a flange spaced concentrically from the shaft, a plurality of spring fingers on the cup-spring and extending radially inwardly for engaging the inner sealing washer to urge said washers in engagement, and a resilient cover for said fingers.

2. A shaft sealing unit comprising a shaft housing having a counterbore, a cup-shaped retainer frictionally mounted in the counterbore, a spacing ring in the retainer, a sealing ring in the retainer between the spacing ring and the shaft, a cup-spring having a flange spaced concentrically from the shaft and snugly fitted in the retainer, one end of the flange bearing against the spacing ring, and spring fingers on the cup-spring and projecting radially inwardly from the flange, said fingers bearing against the sealing ring.

3. A shaft sealing unit comprising a shaft housing having a counterbore, a cup-shaped retainer frictionally mounted in the counterbore, a spacing ring in the retainer, a sealing ring in the retainer between the spacing ring and the shaft, a cup-spring having a flange spaced concentrically from the shaft and snugly fitted in the retainer, one end of the flange bearing against the spacing ring, and spring fingers on the cup-spring and projecting radially inwardly from the flange, said fingers bearing against the sealing ring, a rubber cover on the fingers and an annular beading on the cover bearing against the base of the counterbore.

4. A shaft sealing unit comprising a shaft housing having a counterbore, a cup-shaped retainer frictionally mounted in the counterbore, a spacing ring in the retainer, a sealing ring in the retainer between the spacing ring and the shaft, a cup-spring having a flange spaced concentrically from the shaft and snugly fitted in the retainer, one end of the flange bearing against the spacing ring, and spring fingers on the cup-spring and projecting radially inwardly from the flange, said fingers bearing against the sealing ring, a rubber cover on the fingers, an annular beading on the cover bearing against the counterbore and an inturned lip on the retainer overlying the cup-spring at the junction of the flange and the fingers, said lip also clamping an edge of the cover on the cup-spring.

5. A shaft sealing unit comprising a shaft housing having a counterbore, a cup-shaped retainer frictionally mounted in the counterbore, a spacing ring in the retainer, a plurality of sealing rings in the retainer between the spacing ring and the shaft, a packing ring carried by one of the sealing rings and engaging the shaft, a cup-spring having a flange spaced concentrically from the shaft and snugly fitted in the retainer, one edge of the flange bearing against the spacing ring, and spring fingers on the cup-spring and projecting radially inwardly from the flange, said fingers bearing against an adjacent sealing ring.

RAY L. FRISKNEY.